(12) United States Patent  (10) Patent No.: US 7,654,211 B2
Maloney et al.  (45) Date of Patent: Feb. 2, 2010

(54) MARINE VESSEL TRANSFER SYSTEM

(75) Inventors: Kenneth J. Maloney, Covington, LA (US); W. Keith Dubose, Pensacola, FL (US); E. Douglass Whittaker, Slidell, LA (US); Brett G. Martin, Slidell, LA (US); Robert G. Moore, Lacombe, LA (US)

(73) Assignee: Textron Inc., Wilmington, MA (US)

( * ) Notice: Subject to any disclaimer, the term of this patent is extended or adjusted under 35 U.S.C. 154(b) by 83 days.

(21) Appl. No.: 11/567,476

(22) Filed: Dec. 6, 2006

(65) Prior Publication Data

US 2007/0151499 A1 Jul. 5, 2007

Related U.S. Application Data

(60) Provisional application No. 60/748,449, filed on Dec. 7, 2005, provisional application No. 60/756,951, filed on Jan. 5, 2006.

(51) Int. Cl.
*B63H 7/00* (2006.01)
(52) U.S. Cl. .................. 114/67 R; 114/258; 440/37
(58) Field of Classification Search ............. 440/37; 114/258, 67 R
See application file for complete search history.

(56) References Cited

U.S. PATENT DOCUMENTS

| 1,410,874 | A | * | 3/1922 | Bell et al. ............... 440/37 |
| 1,976,046 | A | | 10/1934 | Tietjens |
| 2,948,250 | A | * | 8/1960 | Peterson ................ 440/37 |
| 2,987,281 | A | * | 6/1961 | Schurr et al. ........... 248/642 |
| 3,065,723 | A | | 11/1962 | Tulin |
| 3,077,173 | A | | 2/1963 | Lang |
| 3,141,436 | A | | 7/1964 | Cathers et al. |
| 3,362,499 | A | | 1/1968 | Tripp |
| 3,403,652 | A | * | 10/1968 | Hardy ................... 114/259 |
| 3,458,007 | A | | 7/1969 | Todd |
| 3,502,168 | A | | 3/1970 | Jones |
| 3,621,932 | A | | 11/1971 | Tattersall et al. |
| 3,817,479 | A | | 6/1974 | Crowley |

(Continued)

FOREIGN PATENT DOCUMENTS

FR 2362035 3/1978

(Continued)

*Primary Examiner*—Stephen Avila
(74) *Attorney, Agent, or Firm*—Garvey, Smith, Nehrbass & North, L.L.C.; Seth M. Nehrbass; Charles C. Garvey, Jr.

(57) ABSTRACT

A vessel transfer system utilizes a larger, surface effect vessel with a hull and a cargo deck, having a pressurized volume of air under its hull. The larger vessel cargo deck is lowered relative to a water surface in order to receive a smaller vessel. Lowering is achieved by depressurizing the volume of pressurized air under the hull. Movable propulsors on an air cushion vehicle permit efficient operation under way in an outer position, while minimizing the envelope dimensions for stowage in a well deck, providing clearance from bridges, docks, etc. in an inner position. In the outer position, the propellers operate in more uniform inflow conditions, resulting in improved performance and lower noise levels. In addition, the craft can be arranged to use a full width stern ramp resulting in time saved during cargo loading/unloading. The propellers will be less likely to ingest green water in high sea states.

56 Claims, 10 Drawing Sheets

U.S. PATENT DOCUMENTS

| | | | |
|---|---|---|---|
| 3,893,538 A | | 7/1975 | Thompson et al. |
| 3,987,865 A | | 10/1976 | Krupp |
| 4,175,636 A | * | 11/1979 | Broughton ................ 180/119 |
| 4,279,322 A | | 7/1981 | Wheeler et al. |
| 4,469,334 A | | 9/1984 | Le Comte |
| 4,489,667 A | | 12/1984 | Moore et al. |
| 4,506,618 A | | 3/1985 | Chaplin |
| 4,543,901 A | | 10/1985 | Stringer |
| 4,646,866 A | | 3/1987 | Bertrand et al. |
| 4,708,077 A | | 11/1987 | Balquet et al. |
| 4,739,719 A | | 4/1988 | Burg |
| 4,767,367 A | | 8/1988 | Stringer |
| 4,932,839 A | * | 6/1990 | Pitchford .................. 416/246 |
| 4,984,754 A | | 1/1991 | Yarrington |
| 5,522,470 A | * | 6/1996 | Stiegler et al. ............. 180/117 |
| 5,651,327 A | | 7/1997 | Whitener |
| 5,708,230 A | * | 1/1998 | Woodall et al. ............ 102/402 |
| 5,722,341 A | * | 3/1998 | Tornqvist ................... 114/260 |
| 5,746,146 A | * | 5/1998 | Bixel, Jr. .................. 114/67 A |
| 5,860,383 A | | 1/1999 | Whitener |
| 5,934,215 A | | 8/1999 | Burg |
| 6,293,216 B1 | | 9/2001 | Barsumian |
| 6,402,576 B1 | * | 6/2002 | Klug ....................... 440/61 R |
| 6,439,148 B1 | | 8/2002 | Lang |
| 6,487,981 B1 | | 12/2002 | Burg |
| 6,526,903 B2 | | 3/2003 | Robinson et al. |
| 6,609,472 B2 | | 8/2003 | Burg |
| 7,000,546 B1 | * | 2/2006 | Bender et al. .............. 102/402 |
| 7,013,826 B2 | | 3/2006 | Maloney et al. |
| 2002/0164231 A1 | | 11/2002 | Lucas et al. |
| 2003/0000440 A1 | | 1/2003 | Burg |
| 2004/0112268 A1 | * | 6/2004 | Maloney et al. ............ 114/288 |
| 2005/0211150 A1 | | 9/2005 | Maloney et al. |
| 2005/0236200 A1 | | 10/2005 | DuBose |

FOREIGN PATENT DOCUMENTS

| | | |
|---|---|---|
| GB | 1109562 | 4/1968 |
| GB | 1191945 | 5/1970 |
| GB | 1215372 | 12/1970 |

* cited by examiner

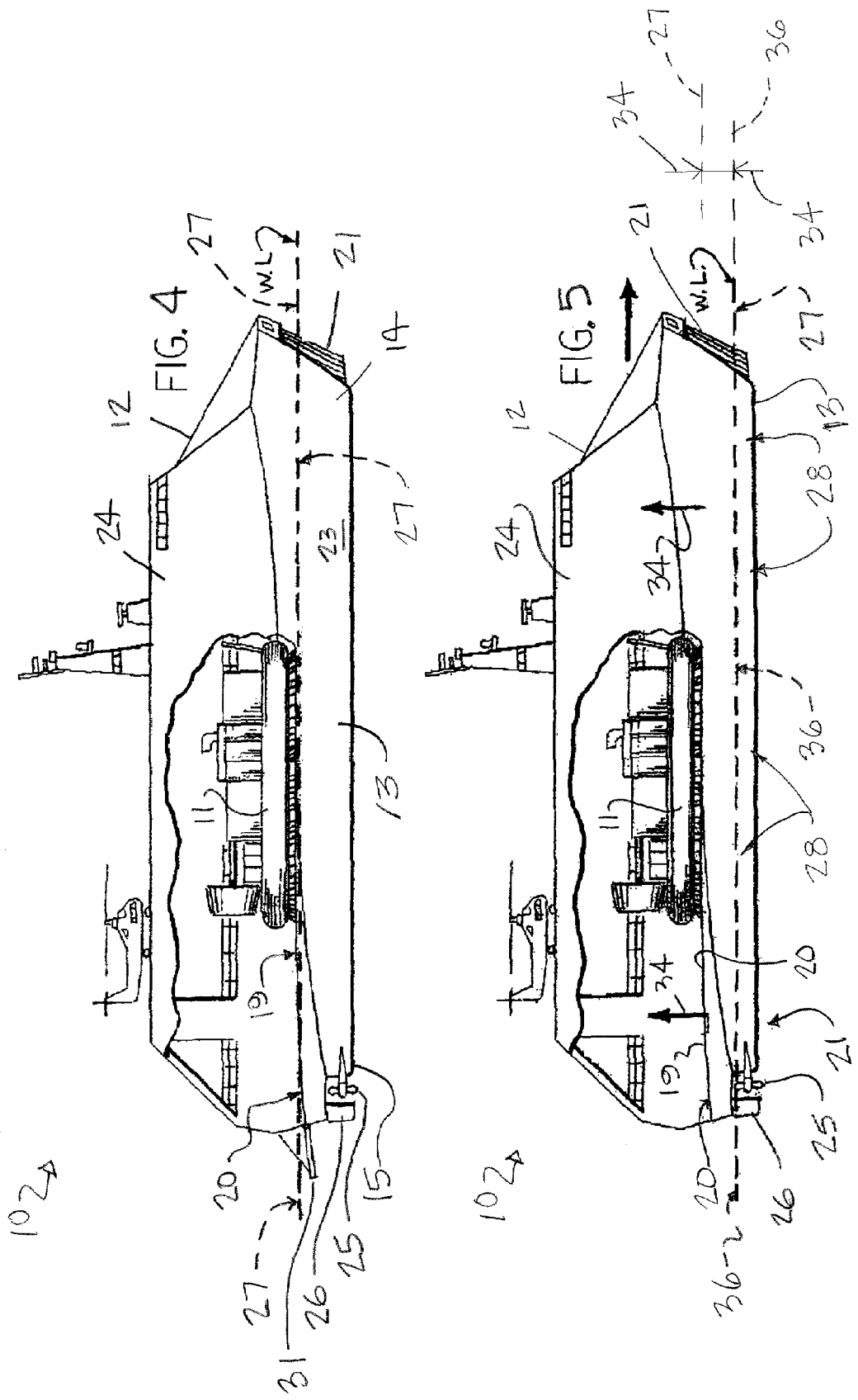

MARINE VESSEL TRANSFER SYSTEM

CROSS-REFERENCE TO RELATED APPLICATIONS

Priority of U.S. Provisional Patent Application Ser. No. 60/748,449, filed 7 Dec. 2005, incorporated herein by reference, is hereby claimed.

Priority of U.S. Provisional Patent Application Ser. No. 60/756,951, filed 5 Jan. 2006, incorporated herein by reference, is hereby claimed.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to the deep water transfer of a first, smaller marine or amphibious vessel to a second, larger vessel that is a surface effect or air cushion vessel that travels upon a pressurized volume of air, wherein transfer includes depressurizing of the air cushion under the second vessel so that its cargo deck is lowered to an elevation that is at or near the water surface. Such transfer can optionally include a combination of ballasting and a lowering of pressure (or depressurization) of the volume of air under the second vessel.

The present invention also relates to an improved air cushion vehicle having a multiple lane loading ramp and deck arrangement with air propulsors that move between inner and outer positions for enabling transfer to a larger vessel (inboard propulsion position) and increased propulsion efficiency (outboard propulsion position).

2. General Background of the Invention

In the prior art, transfer of a smaller vessel to and from a larger vessel (or a first vessel to a second vessel) has typically been achieved by ballasting with water. Usually, a larger marine vessel is ballasted until a cargo deck of the larger marine vessel is at an elevation sufficiently low in the water to enable the smaller marine vessel to float on the water surface while traveling to the cargo deck of the larger vessel.

In general, air cushion vehicles or "ACV's" (also known as surface effect ships or hovercraft) are known. Examples of such ACV's are disclosed in the US Patents listed in the following table. The following table also lists some patents that involve transfer of item(s) to or from a surface effect vessel.

TABLE 1

| U.S. Document No. | Title | Date (MM/DD/YYYY) |
| --- | --- | --- |
| 1,976,046 | Waterfoil | 10/09/1934 |
| 2,405,115 | Floating Structure | 08/06/1946 |
| 3,065,723 | Supercavitating Hydrofoils | 11/27/1962 |
| 3,077,173 | Base Ventilated Hydrofoil | 02/12/1963 |
| 3,141,436 | Hydrofoil Assisted Air Cushion Boat | 07/21/1964 |
| 3,458,007 | Captured Air Bubble (CAB) Ground Effect Machine | 07/29/1969 |

TABLE 1-continued

| U.S. Document No. | Title | Date (MM/DD/YYYY) |
| --- | --- | --- |
| 3,589,058 | Toy Ground Effect Vehicle With Adjustable Stabilizing Weight | 06/29/1971 |
| 3,621,932 | Gas-Cushion Vehicles | 11/23/1971 |
| 3,817,479 | Helicopter Powered Air Cushioned Platform | 06/18/1974 |
| 3,893,538 | Ground Effects Vehicle and An Air Terminal | 07/08/1975 |
| 3,917,022 | Twin Cushion Surface Effect Vehicle | 11/04/1975 |
| 3,987,865 | Gas-Cushion Vehicle Skirt | 10/26/1976 |
| 4,469,334 | Sealing System For The Air Cushion Of An Air-Cushion Vessel | 09/04/1984 |
| 4,489,667 | Surface Effect Ship Seals | 12/25/1984 |
| 4,506,618 | Propeller And Keel Arrangement For Surface Effect Ships | 03/26/1985 |
| 4,535,712 | Variable Air Cushion Mode Vehicle | 08/20/1985 |
| 4,543,901 | Surface Effect Ship Air Cushion Seal System | 10/01/1985 |
| 4,646,866 | Surface Effect Type, Side Keel Vessel Fitted With An Improved Forward Buoyancy Cushion Seal Apparatus | 03/03/1987 |
| 4,660,492 | Catamaran Air Cushion Water Vehicle | 04/28/1987 |
| 4,708,077 | Hull Shapes For Surface Effect Ship With Side Walls And Two Modes Of Operation | 11/24/1987 |
| 4,714,041 | Structure of surface effect ship with side walls | 12/22/1987 |
| 4,739,719 | Movable bow seal air ride boat hull | 04/26/1988 |
| 4,767,367 | Integrated Combination Propeller Drive Shaft Fairing and Water Intake Sea Chest Arrangement, For High Speed Operating Marine Craft | 08/30/1988 |
| 4,984,754 | Heli-Hover Amphibious Surface Effect Vehicle | 01/15/1991 |
| 5,651,327 | Displacement, Submerged Displacement, Air Cushion Hydrofoil Ferry Boat | 07/29/1997 |
| 5,711,494 | Aero-Hydroglider | 01/27/1998 |
| 5,860,383 | Displacement, Submerged Displacement, Air Cushion Hydrofoil Ferry Boat | 01/19/1999 |
| 5,934,215 | Stabilized Air Cushioned Marine Vehicle | 08/10/1999 |
| 6,293,216 | Surface Effect Ship (SES) Hull Configuration Having Improved High Speed Performance and Handling Characteristics | 09/25/2001 |
| 6,439,148 | Low-Drag, High-Speed Ship | 08/27/2002 |
| 2002/0164231 | Craft for Embarking/Landing On Unequipped Shorelines | 11/07/2002 |
| 6,487,981 | Air Assisted Landing Craft | 12/03/2002 |
| 2003/0000440 | Air Assisted Landing Craft | 01/02/2003 |
| 6,526,903 | High speed M-shaped boat hull | 03/04/2003 |
| 6,609,472 | Stable efficient air lubricated ship | 08/26/2003 |
| 2005/0211150 | Variable Hybrid Catamaran Air Cushion Ship | 09/29/2005 |
| 2005/0236200 | Wrapped-cone fingers for skirt systems | 10/27/2005 |
| 7,013,826 | Hybrid Catamaran Air Cushion Ship | 03/21/2006 |

Incorporated herein by reference are the foregoing and U.S. Pat. Nos. 4,767,367; 4,984,754; 6,293,216; and 6,439, 148. These incorporated by reference patents relate generally to air cushion vehicles, surface effect ships or hovercraft.

BRIEF SUMMARY OF THE INVENTION

The present invention includes a vessel transfer system which utilizes a larger vessel, that is a surface effect vessel with a hull and a cargo deck, having a pressurized volume of air under its hull. The larger vessel cargo deck is lowered relative to a water surface in order to receive a smaller vessel. Lowering is achieved by depressurizing or lowering the pressure of the volume of pressurized air under the hull. The present invention further relates to the use of movable propulsors on an air cushion vehicle or ACV to permit efficient operation under way in an outer position, while minimizing the envelope dimensions for stowage in a well deck, providing clearance from bridges, docks etc. in an inner position. In the outer position, the propellers operate in more uniform inflow conditions, resulting in improved performance and lower noise levels. In addition, the craft can be arranged to use a full width stem ramp resulting in time saved during cargo loading and unloading, and the propellers will be less likely to ingest green water in high sea states.

The present invention relates to the use of an air cushion to vary the cargo deck height of a large ship for the purpose of loading and unloading a smaller craft or crafts from the sea, cargo from another ship or cargo from a dock. In all cases, the pressure in the cushion is varied to adjust the elevation of the cargo deck to facilitate cargo transfer. Cushion pressure may be used either alone, or in combination with ballast to achieve the desired cargo deck elevation. Relative to ballast however, pressure variation is much faster, and could be used dynamically to compensate for wave induced motions in addition to the adjustment of steady state deck height.

The present invention provides a method of transferring a first, smaller marine or amphibious vessel to and from a second, larger vessel in a deep water marine environment. The terminology "deep water" as used herein means that neither vessel is supported upon land or a sea bottom during the transfer. The subject first smaller and second larger vessels and their component parts can be constructed from any high strength, light weight material, including but not limited to, high strength steel, aluminum, titanium, composites, or the like.

The invention can be scaled to a wide range of sizes. The range of pressures most likely to be used are 50-250 lb./sq.ft. (24.41 to 122.06 $gf/cm^2$), or ⅓psi (23.41 $gf/cm^2$) to 2 psi (140.61 $gf/cm^2$) and typically less than 5.0 psi (351.53 $gf/cm^2$).

Overall length of the larger vessel could range, for example, from around 500 to 1000 feet (152.40 to 304.80 meters), and overall length of the smaller air cushion vehicle would probably be, for example, about 50 to 150 feet (15.24 to 45.72 meters).

The present invention provides a method of transporting a first marine vessel upon a second marine vessel in a deep water environment, wherein neither vessel is supported by land or a seabed.

The method of the present invention includes providing a first marine vessel and a second vessel that is a surface effect vessel. The second vessel (surface effect vessel) provides a hull with a bow and a stem. The hull has a cargo deck and an under deck volume that can be pressurized with air so that the hull is primarily supported with a pressurized volume of air when it is propelled along the water surface. The first and second vessels are transported to a selected locale in the deep water marine environment.

After reaching the selected locale, the pressure of the volume of air under the hull of the second marine vessel is lowered, so that the hull and cargo deck of the second marine vessel are lowered in elevation relative to the surrounding water surface. Thereafter, the first vessel is transferred to the surrounding water surface of the deep water marine environment from the lowered cargo deck of the second marine vessel.

For recovery, the second marine vessel assumes a lowered position with its under hull volume of air depressurized. The first vessel then travels on the water surface from the surrounding water surface to the cargo deck of the second vessel. At this time of transfer, the lowered cargo deck of the second vessel can be partially submerged. The lowered cargo deck can be at least in part at the level of the water surface. The second vessel can then transfer the first vessel (now on board) to a selected destination once the volume of air under the hull of the second vessel is pressurized. This procedure can be reversed to off load the first, smaller vessel.

The present invention also provides an air cushion vehicle (e.g. the first, smaller vessel) having a hull with a hull periphery, bow, stem, port side, starboard side and deck.

An air based propulsion system is provided for propelling the hull by thrusting into the surrounding air mass.

The air propulsion system includes one or more air propellers that move in reference to the hull between first and second positions, one position placing the air propeller at least in part outboard of the hull periphery.

Hydraulic rams or linear motors are possible mechanisms for pivoting the air propellers between first and second positions.

The air propellers engage the air during use.

One of the air propeller positions places the air propeller within the periphery of the hull.

There are preferably two air propellers, one placed on the port side of the hull, the other placed on the starboard side of the hull.

The port side air propeller preferably moves between an outer position wherein it is at least partially outboard of the hull periphery on the port side of the hull to an inner position within the hull periphery next to the port side of the hull. Similarly, the starboard side air propeller moves between an outer position wherein it is at least partially outboard of the hull periphery on the starboard side of the hull to a position within the hull periphery and next to the starboard side of the hull.

Each air propeller thus moves to a position outside the hull periphery for maximum thrust to a position inside the hull periphery for use in loading onto the deck of another vessel or other use wherein a narrowed width is of value. The air propellers are preferably positioned at the stern of the vessel.

BRIEF DESCRIPTION OF THE SEVERAL VIEWS OF THE DRAWINGS

For a further understanding of the nature, objects, and advantages of the present invention, reference should be had to the following detailed description, read in conjunction with the attached drawings which are identified as follows:

FIG. 4 is a side, elevation view illustrating the method of the present invention and showing a smaller vessel that has been transferred from a surrounding water surface to a larger vessel and wherein the larger vessel is in a lower transfer position that is a displacement mode;

FIG. 5 is a side, elevation view illustrating the method of the present invention and showing a smaller vessel that has been transferred from a surrounding water surface to a larger vessel and wherein the larger vessel is in a higher position, pressurized, travel mode;

DETAILED DESCRIPTION OF THE INVENTION

Figure 1:
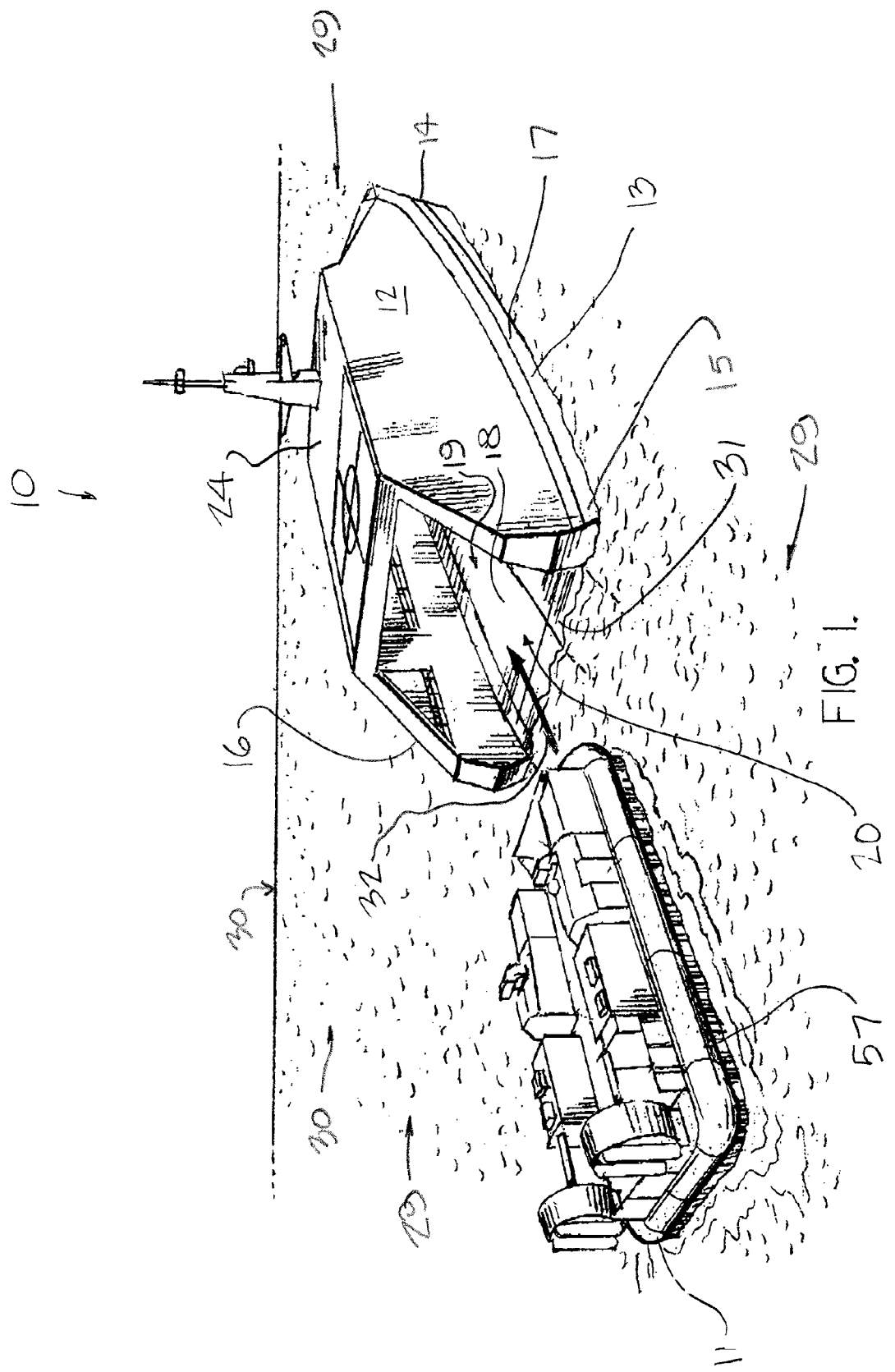
FIG. 1 is a perspective view illustrating the method of the present invention.

FIGS. 1-5 show generally the preferred method of the present invention and the transfer system of the present invention which is designated generally by the numeral 10.

The method of the present invention involves the use of a first, typically smaller marine vessel 11 that is to be transferred to or from the cargo deck 18 of a second, typically larger marine vessel 12. The second vessel 12 will receive the first marine vessel 11 and transport it to a selected locale. The first, smaller vessel 11 can then be off loaded. Such a transfer enables the two vessels 11, 12 to travel with the first vessel 11 resting upon a cargo deck 18 of the second vessel 12.

The first vessel 11 can be any vessel that floats and can include for example a hovercraft, an amphibious vessel or any floating vessel that is able to travel upon a surrounding water surface 30 of a surrounding deep water marine environment 29. As part of the method of the present invention, the first, smaller vessel 11 travels from water surface 30 to the upper surface 19 of cargo deck 18 of second marine vessel 12.

Figure 2:
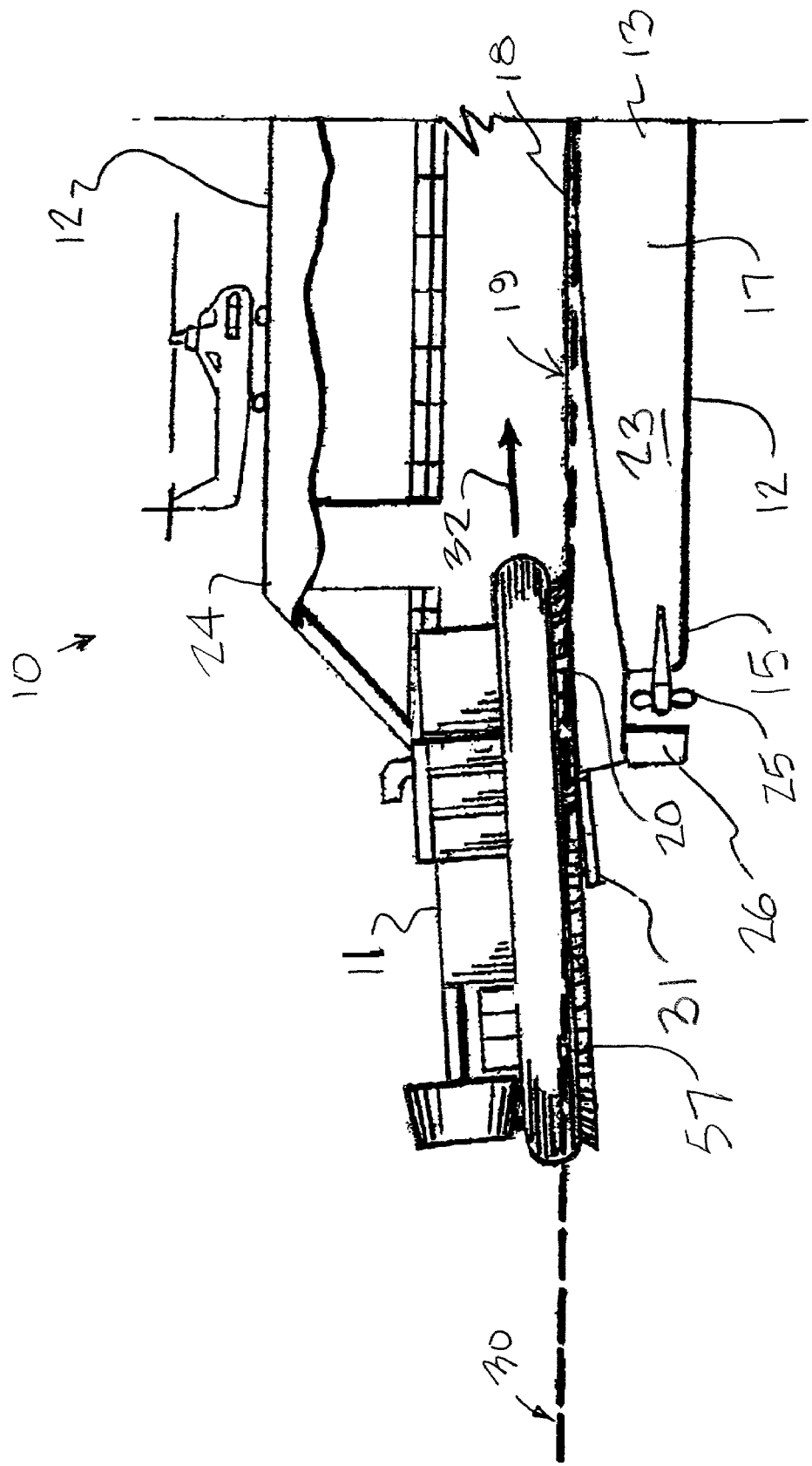
FIG. 2 is an additional perspective view illustrating the method of the present invention.

In FIGS. 1 and 2, the first marine vessel 11 is a smaller marine vessel that provides a continuous inflatable wall that surrounds a pressurized volume of air under the hull of the vehicle. Vessel 11 can also be of the type that has a continuous inflatable skirt or wall 57 that extends around the periphery of the vessel 11. Such a vessel with continuous inflatable skirt can be seen in U.S. Pat. No. 4,984,754, which is hereby incorporated herein by reference.

The second marine vessel 12 is preferably an air cushion vehicle, hovercraft or surface effect vessel. Vessel 12 can be the type that has two spaced apart rigid hulls (e.g. catamaran) and that provides sealing members or skirts forward and aft. The second marine vessel 12 provides a hull 13 that can be a single hull or a pair of spaced apart hull members providing a catamaran type hull. Hull 13 has a bow 14 and a stem 15, a port side 16 and a starboard side 17.

Figure 3:
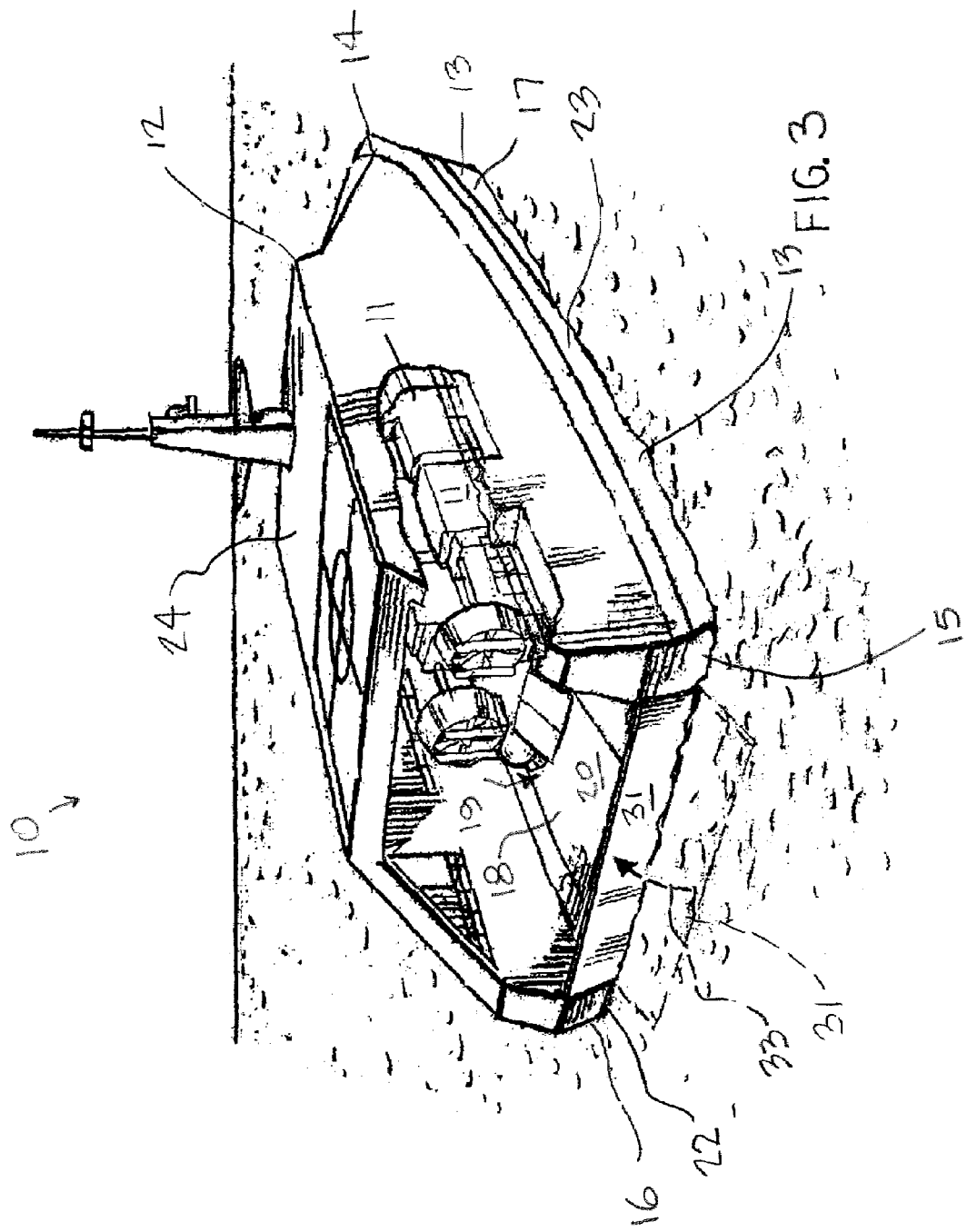
FIG. 3 is a partial perspective view of the preferred embodiment of the apparatus of the present invention showing the position of the first and second vessels during a launch or recovery of the first vessel.
Figure 6:
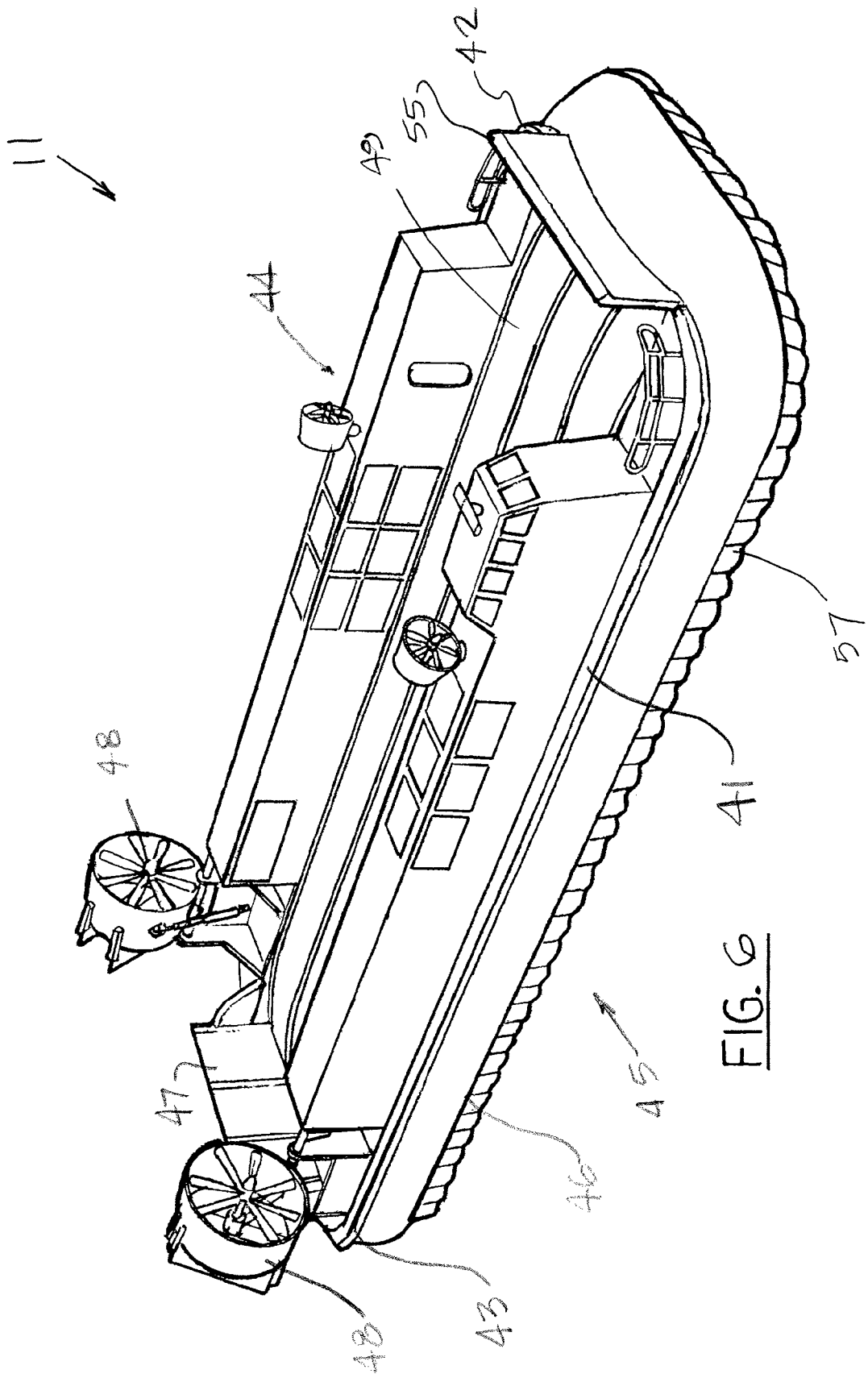
FIG. 6 is a perspective view of the preferred embodiment of the apparatus of the present invention showing the smaller, first marine vessel.

In such a catamaran rigid hulled vessel 12, a pressurized volume of air 28 (see FIG. 5) is trapped under the hull 13. The pressurized volume of air 28 is trapped in between the two rigid hulls and in between front and rear seals or skirts 21. Such rigid hull catamaran surface effect vessels can be seen in U.S. Pat. Nos. 3,987,865 and 4,714,041, each hereby incorporated herein by reference. In FIGS. 3 and 4, the vessel 12 that is shown is a larger vessel that has spaced apart rigid hulls including a port side hull 22 and a starboard side hull 23. Flexible seals 21 can be provided fore and aft. A pressurized volume of air 28 (see FIG. 5) can be trapped under hull 13 in between the spaced apart rigid hulls 22, 23, under the cargo deck 18, in between fore and aft flexible seals 21, and above the water surface 30.

Hull 13 provides a cargo deck 18 having an upper surface 19 that is receptive of first, smaller vessel 11 according to the method of the present invention. The cargo deck 18 can provide an inclined section 20 that is next to or that communicates with the water surface 30. Inclined section 20 or surface 19 can be positioned near or below water surface 30 when a transfer (see FIGS. 2 and 4) of vessel 11 to cargo deck 18 is to take place.

In FIG. 4, cargo deck 18 can provide an inclined section 20 that is near that part of vessel 12 that will receive vessel 11. In FIGS. 3 and 4, vessel 11 transfers from surrounding deep water marine environment 29 to cargo deck 18 at a position next to stem 15 of hull 13. However, it should be understood that such a transfer could take place at the bow of vessel 12, or at another location if desired.

Hull 13 can provide a superstructure 24. Hull 13 can be propelled using propellers 25 or jets as examples. In the embodiment shown in FIGS. 1-4, a propeller 25 can be provided to each of the hulls 22, 23. Steering is provided with a rudder 26 that is preferably positioned behind each propeller 25, a rudder 26 is thus mounted on each of the port and starboard hulls 22, 23.

Gate 31 is an optional feature that is shown in FIGS. 1-4. Gate 31 can be a part of cargo deck 18 that pivots to an open position which is shown in FIGS. 1, 2 and 4. Gate 31 can pivot to a closed position as indicated schematically by arrow 33 in FIG. 3. It should be understood however that gate 31 is an optional feature that can help dampen waves during transfer.

In FIGS. 1 and 2, arrow 32 schematically illustrates the forward movement of first vessel 11 toward cargo deck 18 of second vessel 12. In FIGS. 1, 2 and 4, second vessel 12 is in its lowered or displacement mode, as indicated by the reference line 36 designating the water line relative to the vessel hull 13. In FIG. 5, arrows 34 illustrate schematically the elevation of the hull 12 relative to the water surface 30. Reference line 27 in FIG. 5 shows the water line in reference to hull 13 when the hull 13 is on its air cushion 28 for traveling. Arrows 34 show that the upper deck 19 of cargo deck 18 has been elevated a distance indicated by arrows 77 in FIG. 5, i.e. the distance between reference lines 27 and 36.

In order to transfer the vessel 11 to the cargo deck 18 of the vessel 12, the vessel 12 simply lowers the pressure of the pressurized volume of air that is contained under its hull 13. For a hovercraft or surface effect ship such as the vessel 12, this is accomplished by deactivating the powered fans that create the pressurized cushion of air upon which the vessel 12 travels. When a pressure lowering occurs, the vessel 12 is lowered in the water from a higher position shown in FIG. 5 (reference line 36) to the lower position shown in FIG. 4 (reference line 27).

In FIG. 5, reference line 27 indicates the position of the water line when the vessel 12 is supported by the air cushion. In FIG. 5, a pressurized cushion or pressurized volume of air elevates the vessel 12 to the position shown. In FIGS. 1, 2 and 4, the pressure of the pressurized volume of air has been reduced so that the vessel 12 lowers in the water. This lowering of vessel 12 places cargo deck 18 upper surface 19 at, near or next to the water surface 30.

FIGS. 6-14 show a more detailed view of a suitable first, smaller marine vessel 11. First vessel 11 provides a hull 41 having bow 42 and stern 43 portions. The hull 41 provides a port side 44 and a starboard side 45. A hull periphery 46 is shown for purposes of reference when discussing the movement of the air propulsors or propellers 48 between the inner or inboard position of FIG. 9 and the outer or outboard position of FIG. 8.

A stem ramp 47 is positioned at stern 43, in between propulsors 48. Ramp 47 is preferably of a width that enables full width loading of three lanes of vehicles 50 when the propulsors 48 are in the outboard position of FIGS. 7 and 8.

Figure 7:
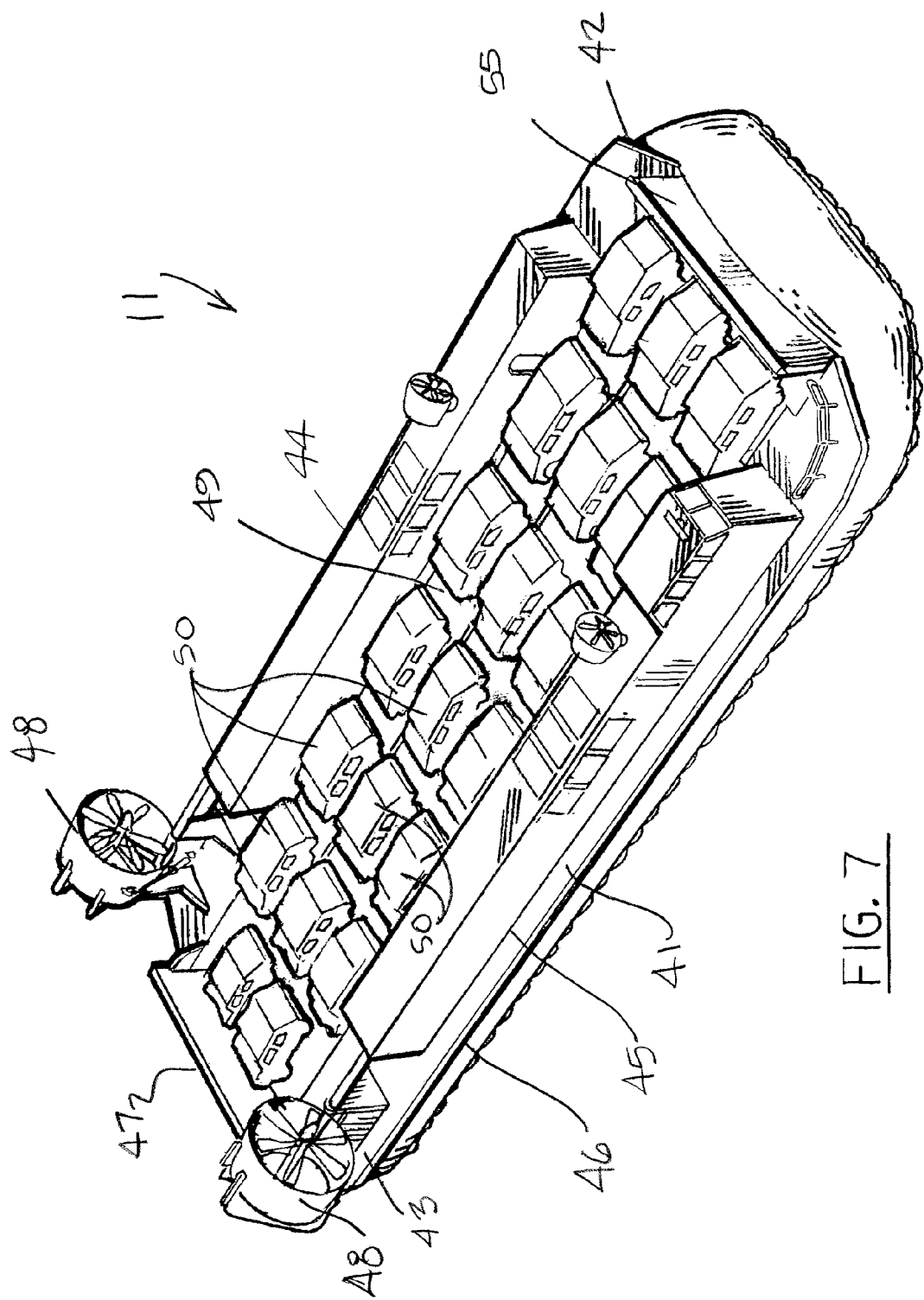
FIG. 7 is a perspective view of the preferred embodiment of the apparatus of the present invention showing in more detail, the deck loaded with multiple vehicles occupying multiple (three) lanes.

The hull 41 provides a deck area 49 for containing vehicles 50. As shown in FIG. 7, multiple lanes of vehicles 50 are provided so that three vehicles 50 at a time can be loaded to deck area 49 using the three lane stern ramp 47. A bow ramp 55 is likewise provided for unloading vehicles 50, three lanes at a time.

Figure 8:
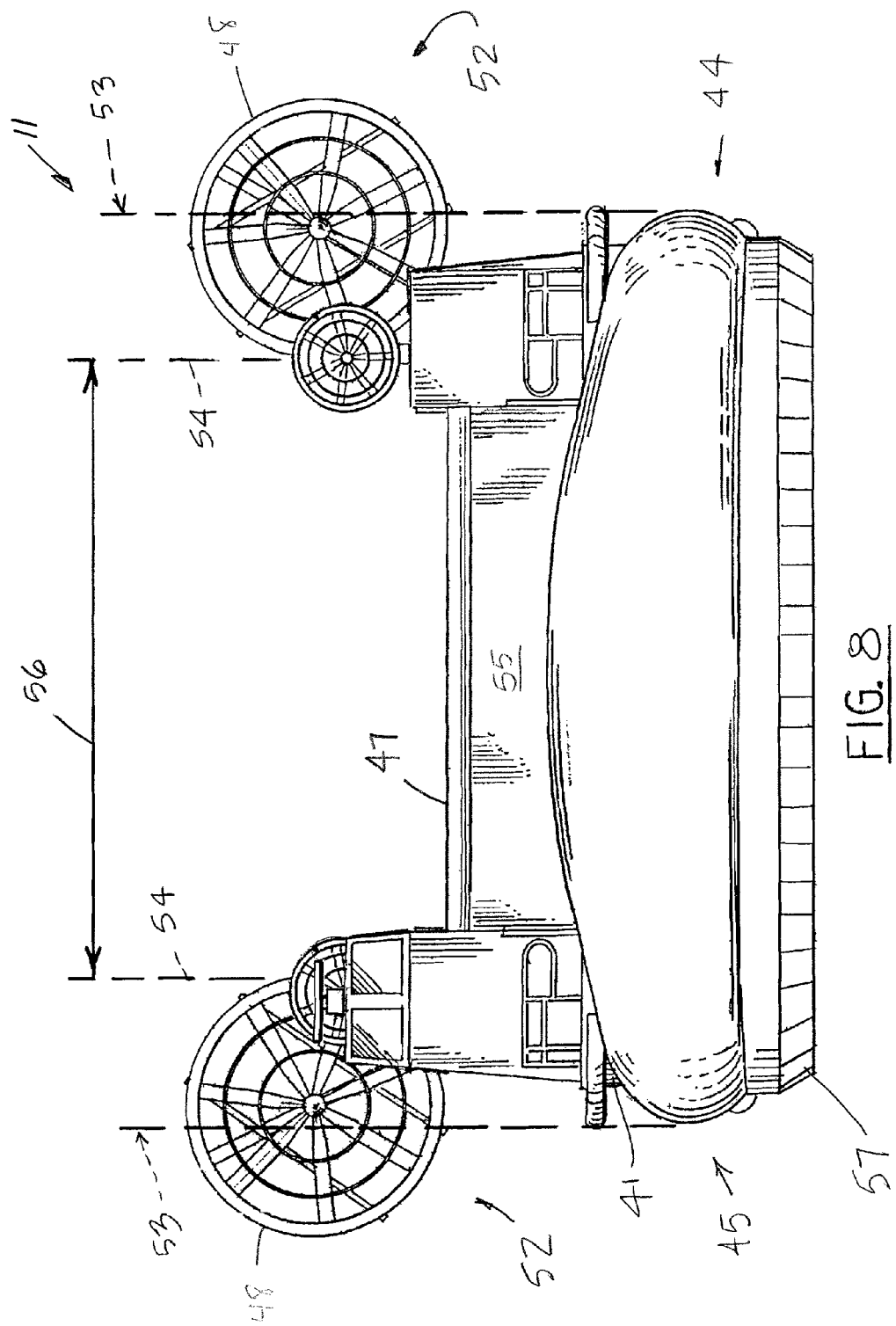
FIG. 8 is a front, elevation view of the preferred embodiment of the apparatus of the present invention showing the main propulsors pivoted outward for increased thrust, efficiency and full width stem ramp capability.
Figure 9:
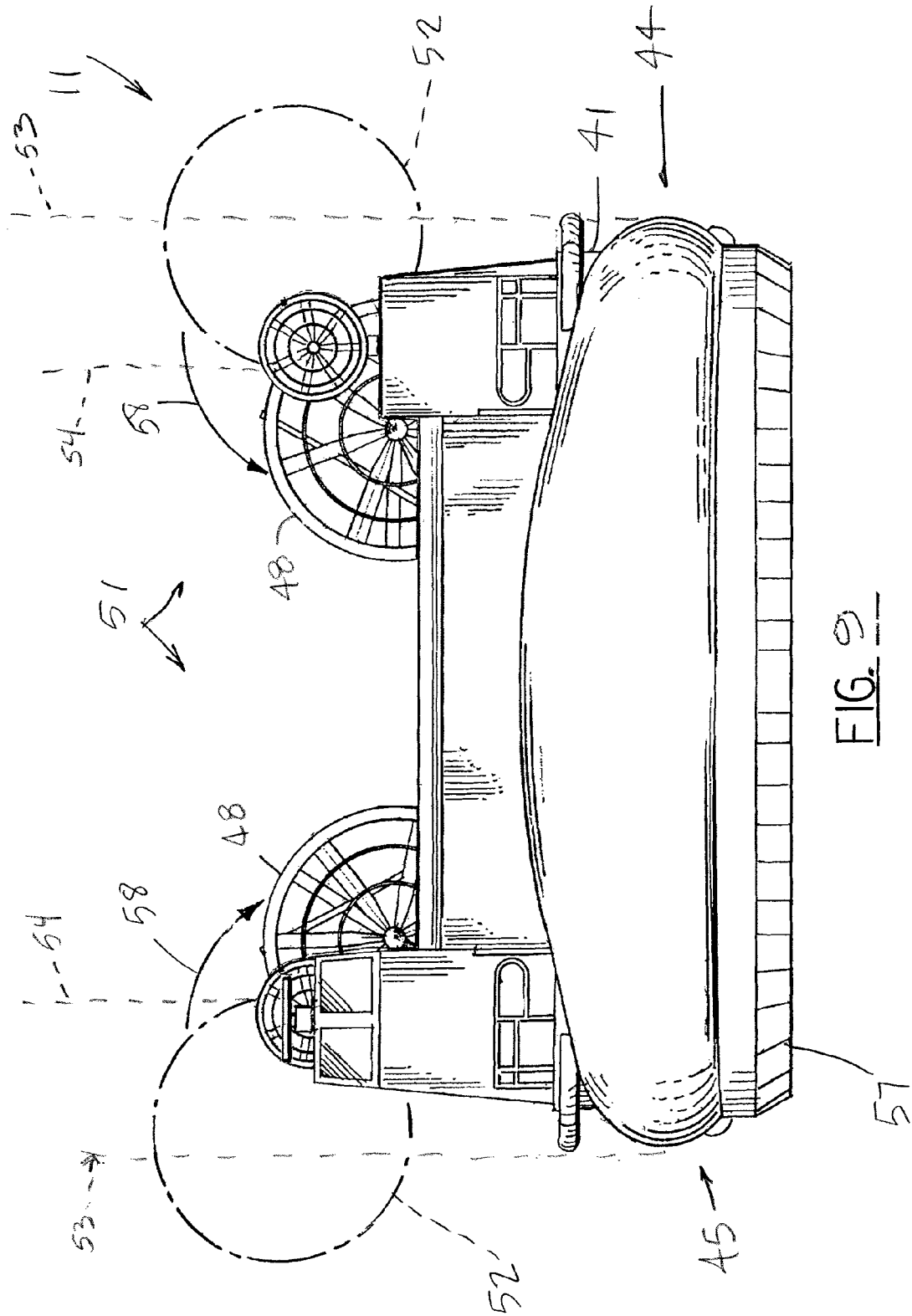
FIG. 9 is a front, elevation view of the preferred embodiment of the apparatus of the present invention showing the main propulsors pivoted inward for well-deck compatibility.
Figure 10:
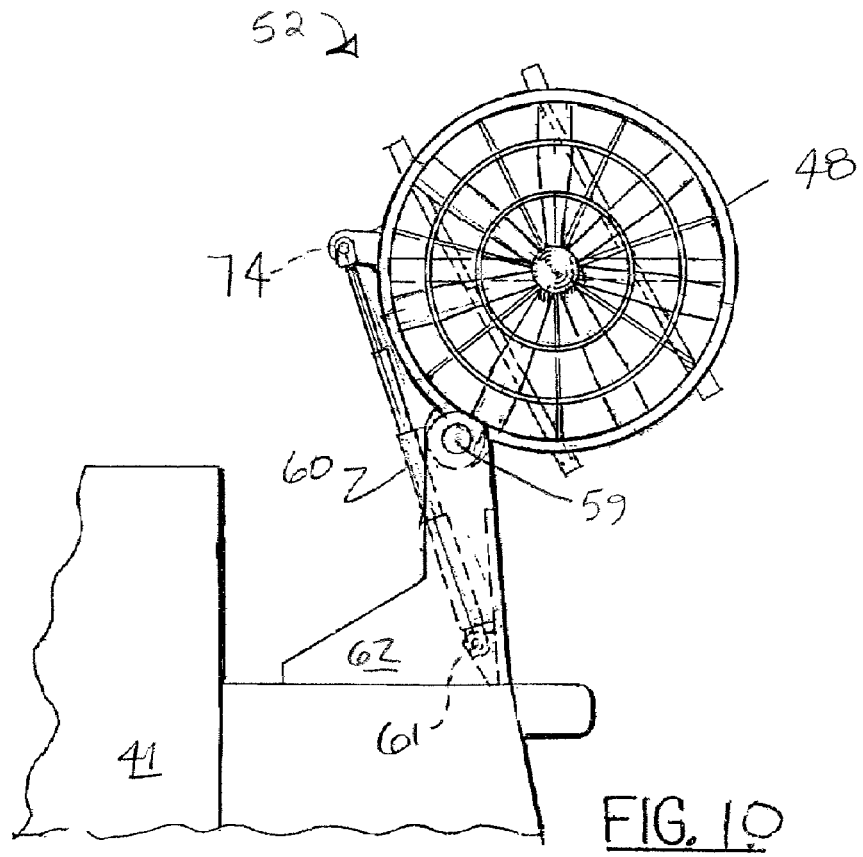
FIG. 10 is a fragmentary elevation view of the preferred embodiment of the apparatus of the present invention and showing the propulsor fan in an outboard operating position.

In FIGS. 8-14, the movement of air propulsors or propellers 48 is shown between the inner or inboard position 51 (FIGS. 9 and 11) and the outer or outboard position 52 (FIGS. 8 and 10). Each of the propellers 48 is a variable geometry main propulsor 48 that moves to the position of FIGS. 8 and 10 for enabling more efficiency and the position of FIGS. 9 and 11 which allows the first vessel 11 to be loaded onto second larger vessel 12 without damage to the propulsors 48.

In FIGS. 8 and 9, reference numbers 53 and 54 are provided on the port and starboard sides of hull 41. Vertical reference line 53 extends upwardly from the periphery 46 of hull 41. Vertical reference line 54 extends upwardly from the inside edge of propulsor 48. In the position of FIG. 8, it can be seen that at least a part of each of propulsors 48 is outboard of hull periphery 46 and thus outboard of reference lines 53 and 54. When the propulsors 48 are in the position of FIG. 8, the distance between them as indicated by arrow 56 is equal to or wider than the width of the multiple (e.g. three) lane stem ramp 47. In the position of FIG. 9, it can be seen that at least a part of each of propulsors 48 is inboard of hull periphery 46 and thus inboard of reference lines 53 and 54.

As can be seen in FIGS. 8-11, the air propulsion system includes a pair of air propellers 48 that each move generally laterally in reference to the hull between first and second positions (see FIG. 9), one position 52 placing each air propeller at least in part outboard of the hull periphery 46 (see FIG. 8), and a second position 51 (see FIG. 9) placing a majority of each propeller inboard of the hull periphery 46.

Figure 11:
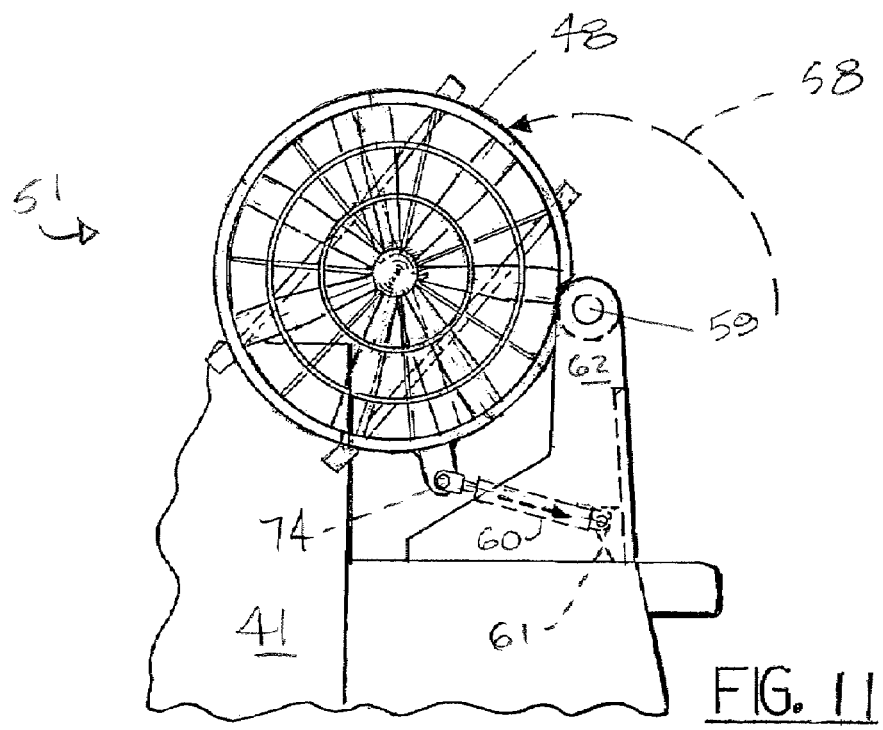
FIG. 11 is a fragmentary elevation view of the preferred embodiment of the apparatus of the present invention and showing the propulsor fan in an inboard loading position.

The propulsors 48 in the position of FIG. 8 do not in any way interfere with the loading of vehicles 50 to deck area 49, including when loading multiple lanes at a time using the full width of multiple lane stem ramp 47. FIGS. 10-14 show in more detail the movable connection between the propeller 48 and hull 41. In FIGS. 10 and 11, a pivotal connection 59 can be used to join propeller 48 to support structure 62 which is connected (for example, bolted or welded) to the vessel hull 41. A motor such as hydraulic cylinder 60 can be used to rotate propeller 48 relative to ships hull 41 as indicated schematically by the arrow 58 in FIGS. 9 and 11. Hydraulic cylinder 60 can thus be connected to support structure 62 with pinned connection 61. A pinned connection 74 can be used to attach hydraulic cylinder 60 to propeller 48.

Figure 12:
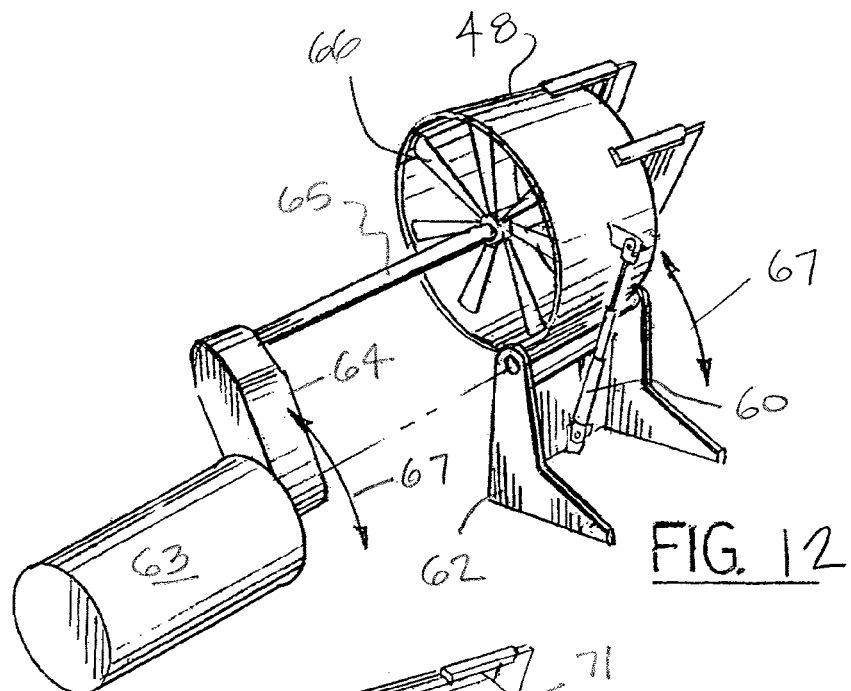
FIG. 12 is a fragmentary perspective view of the preferred embodiment of the apparatus of the present invention illustrating a mechanism for moving the propulsor fan in between inboard and outboard positions.
Figure 13:
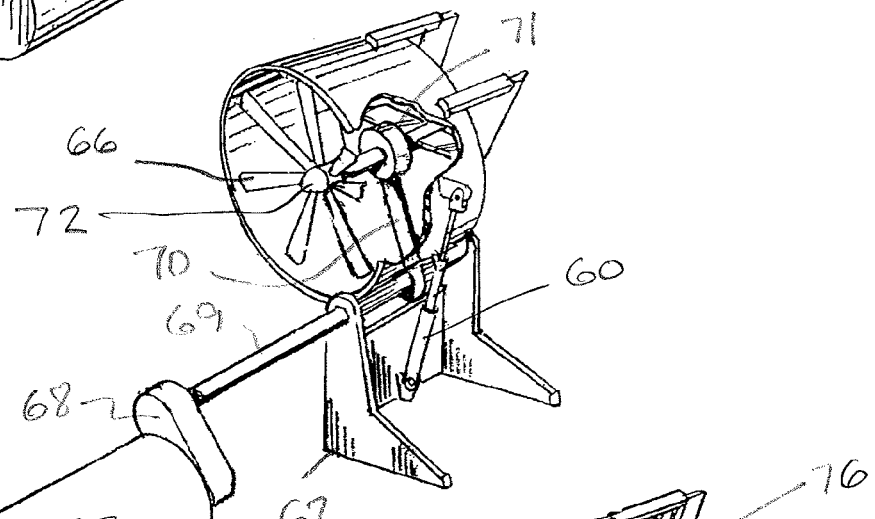
FIG. 13 is a fragmentary perspective view of the preferred embodiment of the apparatus of the present invention illustrating a mechanism for moving the propulsor fan in between inboard and outboard positions.
Figure 14:
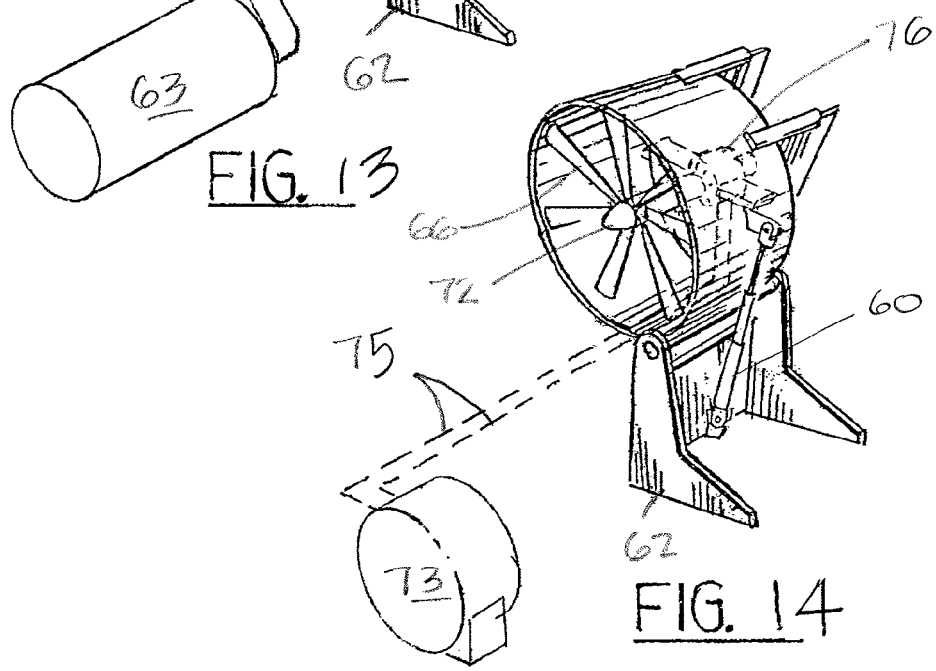
FIG. 14 is a fragmentary perspective view of the preferred embodiment of the apparatus of the present invention illustrating a mechanism for moving the propulsor fan in between inboard and outboard positions.

In FIGS. 12-14, alternate methods for driving the propeller blades 66 are illustrated. In FIG. 12, motor drive 63 interfaces with propeller shaft 65 using a transmission 64. Arrow 67 illustrates that transmission 64 rotates with motor drive 63 and with shaft 65 and fan 48, as the fan 48 moves in an arcuate path as shown by arrow 67. Similarly, the motor drive 63 in FIG. 13 interfaces with drive shaft 69 using a transmission 68. A right angle drive 70 connects shaft 69 to propeller shaft 72 using a gear box 71.

In FIG. 14, a power generator 73 produces electricity that travels via transmission lines 75 to electric motor 76 which rotates propeller shaft 72 to which blades 66 are attached.

The following is a list of suitable parts and materials for the various elements of the preferred embodiment of the present invention.

| PARTS LIST | |
|---|---|
| Part Number | Description |
| 10 | vessel transfer system |
| 11 | first marine vessel |
| 12 | second marine vessel |
| 13 | hull |
| 14 | bow |
| 15 | stern |
| 16 | port side |
| 17 | starboard side |
| 18 | cargo deck |
| 19 | deck upper surface |
| 20 | inclined section of cargo deck |
| 21 | flexible seal or skirt |
| 22 | port hull |
| 23 | starboard hull |
| 24 | superstructure |
| 25 | propeller |
| 26 | rudder |
| 27 | reference line |
| 28 | pressurized air volume |
| 29 | deep water environment |
| 30 | water surface |
| 31 | gate section of cargo deck |
| 32 | arrow (vessel 1 launch/recovery) |
| 33 | arrow (gate movement) |
| 34 | arrow vessel 2 (on/off cushion) |
| 35 | arrows |
| 36 | reference line |
| 41 | hull |
| 42 | bow |
| 43 | stern |
| 44 | port side |
| 45 | starboard side |
| 46 | hull periphery |
| 47 | stern ramp |
| 48 | propulsors |
| 49 | deck area |
| 50 | vehicle |
| 51 | inner position |
| 52 | outer position |
| 53 | reference line |
| 54 | reference line |
| 55 | bow ramp |

-continued

PARTS LIST

| Part Number | Description |
| --- | --- |
| 56 | arrow, ramp width |
| 57 | inflatable skirt |
| 58 | arrow |
| 59 | pivot |
| 60 | hydraulic cylinder |
| 61 | pinned connection |
| 62 | support structure |
| 63 | motor drive |
| 64 | transmission |
| 65 | propeller shaft |
| 66 | propeller blade |
| 67 | arrow |
| 68 | transmission |
| 69 | drive shaft |
| 70 | right angle drive |
| 71 | gear box |
| 72 | propeller shaft |
| 73 | power generator |
| 74 | pinned connection |
| 75 | transmission |
| 76 | electric motor |

All measurements disclosed herein are at standard temperature and pressure, at sea level on earth, unless indicated otherwise.

The forgoing embodiments are presented by way of example only; the scope of the present invention is to be limited only by the following claims.

The invention claimed is:

1. A method of transporting a smaller marine vessel upon a larger marine vessel that is a surface effect ship, comprising the steps of:
   a) providing a larger marine vessel that is a surface effect ship having a hull, and a propulsion system and one or more powered fans that enable a pressurized volume of air to be placed under the hull, said larger vessel traveling in a first, upper hull position that is generated by placing said pressurized volume of air under the hull of the larger marine vessel, said larger marine vessel having a cargo deck;
   b) the larger marine vessel traveling to a selected locale that is in deep water so that the hull of the larger marine vessel is not load bearing upon land or the seabed, a water surface area being next to the larger marine vessel;
   c) depressurizing the volume of air under the hull of the larger marine vessel by deactivating the fans so that the hull of the larger marine vessel lowers to a second, lower hull position;
   d) wherein in step "c" at least a part of the cargo deck is positioned next to the water surface to define a point of entry;
   e) the smaller marine vessel traveling to the selected locale;
   f) positioning the smaller marine vessel next to the larger marine vessel, wherein the smaller marine vessel is in deep water so that the hull of the smaller marine vessel is not load bearing upon land or the seabed;
   g) the smaller marine vessel traveling from the water surface area surrounding the larger marine vessel to the cargo deck of the larger marine vessel via the point of entry and while the larger marine vessel is in the lower hull position; and
   h) pressurizing the volume of air under the hull of the larger marine vessel by activating the powered fans until its hull, cargo deck and the smaller vessel that was placed upon the cargo deck in step "f" are elevated to the upper hull position.

2. The method of claim 1, wherein the smaller marine vessel is a surface effect vessel.

3. The method of claim 1, wherein the smaller marine vessel is an amphibious vessel.

4. The method of claim 1, wherein the smaller marine vessel is a hovercraft.

5. The method of claim 1, wherein the larger marine vessel has a pair of spaced apart rigid hulls, a forward skirt and an aft skirt.

6. The method of claim 1 wherein step "d" includes positioning at least a part of the cargo deck near the water surface.

7. The method of claim 6 wherein the cargo deck communicates with the stern of the larger marine vessel and in step "f" transfer occurs at the stern of the larger marine vessel.

8. The method of claim 6 wherein the cargo deck communicates with the bow of the larger marine vessel and in step "f" transfer occurs at the bow of the larger marine vessel.

9. The method of claim 7 wherein the in step "f" the cargo deck is positioned near the water surface at the stern of the larger marine vessel.

10. The method of claim 7 wherein the cargo deck communicates with the stern of the larger marine vessel.

11. The method of claim 6 wherein the cargo deck has an inclined portion and in step "f" the smaller marine vessel travels to the point of entry by engaging the inclined portion.

12. The method of claim 1 further comprising lowering the larger marine vessel in step "c" larger marine vessel is lowered with ballasting in addition to depressurizing.

13. The method of claim 1 wherein in step "a" the larger vessel has a pair of rigid, spaced apart hulls.

14. The method of claim 1 wherein in step "a" the larger vessel has a peripheral inflatable member or members.

15. The method of claim 13 wherein the large vessel has front and rear curtains that surround the under deck area.

16. The method of claim 1 wherein in step "d" the point of entry is at the hull stern.

17. The method of claim 1 wherein in step "d" the point of entry is at the hull bow.

18. The method of claim 1 wherein the hull has side walls on opposite sides of the cargo deck.

19. The method of claim 18 wherein step "d" includes positioning at least a part of the cargo deck near the water surface.

20. The method of claim 1 wherein in step "g" more than one smaller marine vessel travel to the cargo deck of the larger marine vessel at a time.

21. The method of claim 1 wherein in step "g" multiple smaller marine vessels travel nearly simultaneously to the cargo deck of the larger marine vessel.

22. A method of transferring a first marine vessel to a second marine vessel in a deep water environment that has a water surface and wherein neither vessel is supported by a seabed, comprising the steps of:
   a) providing a first marine vessel;
   b) providing a second marine vessel having a hull with a bow and stern, a cargo deck, one or more powered fans and an underdeck area that can be pressurized with air by activating the powered fans until the hull is primarily supported with a pressurized volume of air, the second marine vessel being a surface effect ship;
   c) transporting the first and second marine vessels to a selected locale upon a water surface in a deep water marine environment;

d) pressurizing the volume of air under the hull of the second marine vessel at least for a time period in step "c";

e) lowering the pressure of the volume of air under the hull of the second marine vessel by deactivating the fans, wherein the hull and the cargo deck of the second marine vessel are lowered in elevation relative to the water surface; and f) the first vessel transferring from the water surface of the deep water marine environment to the lowered cargo deck of the second marine vessel.

23. The method of claim 22 wherein step "f" is completed after step "e" is completed.

24. The method of claim 22 wherein in step "e" the pressure is lowered to a pressure range near ambient atmospheric pressure (Pa).

25. The method of claim 22 wherein in step "d" the pressurized volume of air has a pressure greater than ambient atmospheric pressure (Pa).

26. The method of claim 25 wherein in step "e" the pressure is lowered to less than 5.0 psi.

27. The method of claim 22 wherein the first marine vessel is a hovercraft.

28. The method of claim 22 wherein the first marine vessel is a surface effect ship.

29. The method of claim 22 wherein the cargo deck is at least partially inclined and in step "f" the first vessel travels from the water surface to the inclined portion of the cargo deck.

30. The method of claim 29 wherein the inclined portion of the cargo deck is next to the hull stern.

31. The method of claim 29 wherein the inclined portion of the cargo deck is next to the hull bow.

32. The method of claim 22 wherein the first marine vessel is an amphibious vessel.

33. The method of claim 22 wherein step "e" includes lowering the hull of the second marine vessel until a part of the cargo deck is located next to the water surface.

34. The method of claim 22 wherein step "e" includes lowering the hull of the second marine vessel until a part of the cargo deck is located at the water surface.

35. The method of claim 22 wherein step "e" includes lowering the hull of the second marine vessel until a part of the cargo deck is located below the water surface.

36. The method of claim 22 wherein step "e" includes lowering the hull of the second marine vessel until a part of the cargo deck is located at an elevation that is near the water surface.

37. The method of transferring a first marine vessel to a second marine vessel of claim 22 wherein in step "f" more than one first marine vessels travel to the cargo deck of the second marine vessel at a time.

38. The method of transferring a first marine vessel to a second marine vessel of claim 22 wherein in step "f" multiple first marine vessels travel nearly simultaneously to the cargo deck of the second marine vessel.

39. A method of transporting a pair of marine vessels upon a water surface, comprising the steps of:

a) providing first and second marine vessels comprising said pair of marine vessels, wherein the first marine vessel is to be loaded upon and transported by the second marine vessel;

b) wherein in step "a" said second vessel is a surface effect ship having a hull, one or more powered blowers, a propulsion system for self propelling the hull and a cargo deck, said second vessel being configured to travel in at least two modes including a first mode wherein a first, upper hull elevation is generated by using the powered blowers to place a volume of air at a pressure that is greater than ambient atmospheric pressure under the hull of the second marine vessel and a second mode wherein the hull of the second marine vessel is positioned at a lower elevation;

c) the second marine vessel traveling to a selected locale while at least for a time being in the first mode of travel;

d) depressurizing the volume of air under the hull of the larger marine vessel by deactivating one or more of the powered blowers until it lowers to said lower hull position;

e) wherein in step "d" at least a part of the cargo deck is positioned next to the water surface to define a point of entry;

f) the first marine vessel traveling to the selected locale and to a position next to the second marine vessel, wherein the first marine vessel is in deep water so that the hull of the first marine vessel is not load bearing upon land or the seabed;

g) the first marine vessel traveling from the water surface area surrounding the larger marine vessel to the cargo deck of the second marine vessel via the point of entry and in deep water so that the hull of the second marine vessel is not load bearing upon land or the seabed; and h) the second vessel leaving the selected locale, wherein the first vessel is supported upon the cargo deck of the second vessel, and wherein the second vessel travels at least for a time in the first mode of travel.

40. The method of claim 39 further comprising using a combination of ballasting and depressurizing in step "d" to lower the second marine vessel to the lower hull position.

41. The method of claim 39 wherein in steps "d" and "e" the cargo deck is positioned at least partially below the water surface.

42. The method of claim 39 wherein in step "b" the hull of the second marine vessel includes a pair of spaced apart rigid hulls, a forward seal, an aft seal and steps "b" and "c" include positioning the pressurized volume of air in between the hulls and in between the forward and aft seals.

43. The method of claim 39 wherein the pressure is lowered in step "d" to a pressure of about ambient atmospheric pressure.

44. The method of claim 39 wherein the second vessel is a surface effect ship having one or more inflatable peripheral members and in steps "c" and "d" include positioning the pressurized volume of air inside of the peripheral members.

45. Apparatus for performing the method of claim 1.

46. An air cushion vehicle comprising:

a) a hull having a hull periphery, bow, stern, port side, starboard side and deck portions;

b) an air based propulsion system for propelling the hull by thrusting in the surrounding air mass; and c) the air propulsion system including a pair of air propellers that each move generally laterally in reference to the hull between first and second positions, one position placing each air propeller at least in part outboard of the hull periphery, and a second position placing a majority of each propeller inboard of the hull periphery.

47. The air cushion vehicle of claim 46 wherein hydraulic rams or linear motors are mechanisms for pivoting the air propellers between first and second positions.

48. The air cushion vehicle of claim 46 wherein the air propellers engage the air during use.

49. The air cushion vehicle of claim 46 wherein one of the air propeller positions places the air propeller entirely within the periphery of the hull.

50. The air cushion vehicle of claim 46 wherein one air propeller is positioned next to the port side portion of the hull.

51. The air cushion vehicle of claim 46 wherein one air propeller is positioned next to the starboard side portion of the hull.

52. The air cushion vehicle of claim 50 wherein the port side air propeller moves between an outer position wherein it is at least partially outboard of the hull periphery on the port side of the hull to a position within the hull periphery next to the port side of the hull.

53. The air cushion vehicle of claim 51 wherein the starboard side air propeller moves between an outer position wherein it is at least partially outboard of the hull periphery on the starboard side of the hull to a position within the hull periphery next to the starboard side of the hull.

54. The air cushion vehicle of claim 46 wherein each air propeller moves between a position outside the hull periphery to a position inside the hull periphery, the air propellers being mounted on respective port and starboard sides of the stern portion of the hull.

55. A method of transporting a smaller marine vessel upon a larger marine vessel that is a surface effect ship, comprising the steps of:
- a) providing a larger marine vessel that is a surface effect ship having a hull, a propulsion system and one or more powered fans, said larger vessel traveling in a first, upper hull position that is generated by activating the powered fans to place a pressurized volume of air under the hull of the larger marine vessel, said larger marine vessel having a cargo deck;
- b) the larger marine vessel traveling to a selected locale that is in deep water so that the hull of the larger marine vessel is not load bearing upon land or the seabed, a water surface area being next to the larger marine vessel;
- c) depressurizing the volume of air under the hull of the larger marine vessel by deactivating one or more of the powered fans until the hull of the larger marine vessel lowers to a second, lower hull position;
- d) wherein in step "c" at least a part of the cargo deck is positioned next to the water surface to define a point of entry;
- e) the smaller marine vessel comprising the vehicle of any one of claims 46-49 and 50-54 and traveling to the selected locale;
- f) positioning the smaller marine vessel next to the larger marine vessel, wherein the smaller marine vessel is in deep water so that the hull of the smaller marine vessel is not load bearing upon land or the seabed;
- g) the smaller marine vessel traveling from the water surface area surrounding the larger marine vessel to the cargo deck of the larger marine vessel via the point of entry and while the larger marine vessel is in the lower hull position; and
- h) pressurizing the volume of air under the hull of the larger marine vessel by activating one or more of the powered fans until its hull, cargo deck and the smaller vessel that was placed upon the cargo deck in step "f" are elevated to the upper hull position.

56. The apparatus of claim 45, wherein the smaller vessel comprises:
- a) a hull having a hull periphery, bow, stem, port side, starboard side and deck portions;
- b) an air based propulsion system for propelling the hull by thrusting in the surrounding air mass;
- c) the air propulsion system including one or more air propellers that move in reference to the hull between first and second positions, one position placing the air propeller at least in part outboard of the hull periphery.

* * * * *